United States Patent

[11] 3,582,104

[72] Inventor Walter S. Eggert, Jr.
  Huntingdon Valley, Pa.
[21] Appl. No. 854,695
[22] Filed Sept. 2, 1969
[45] Patented June 1, 1971
[73] Assignee The Budd Company
  Philadelphia, Pa.

[54] PIVOTAL AXLE MOUNTING FOR AN AIRCRAFT TRANSFER VEHICLE
8 Claims, 7 Drawing Figs.

[52] U.S. Cl. .................................................. 280/80,
  280/111, 280/6, 296/28
[51] Int. Cl. .................................................. B60g 1/02,
  B60p 3/00
[50] Field of Search .................................................. 280/80,
  111, 112, 5, 6.1, 6.11, 43.23; 180/36

[56] References Cited
UNITED STATES PATENTS
3,077,952  2/1963  Neises .................. 280/6
3,292,943  12/1966  Crockett .................. 280/111

FOREIGN PATENTS
1,007,085  4/1952  France .................. 280/111
374,292  2/1964  Switzerland .................. 296/28.1

Primary Examiner—Kenneth H. Betts
Attorneys—Thomas I. Davenport, Edward M. Farrell, John D. Sowell, Alford L. Trueax, Jr. and William R. Nolte ABSTRACT: An improved mechanical support arrangement is provided for a vehicle having a pod for transporting passengers. The pod is supported on front and rear vertical posts mounted on the ends of a main elongated horizontal support member. The shaft member rests on the front axle of the vehicle transverse thereto with the ends of the shaft extending in opposite directions therefrom. Means are secured to the ends of the shaft to support the support member away from the axle. A pair of diagonal strut members connect from the ends of the axle to the rearwardly extending end of the shaft. A pair of hydraulic units connect the ends of the axle diagonally upwardly to the vertical post.

INVENTOR.
WALTER S. EGGERT, JR.
BY
Edward M. Farrell
ATTORNEY

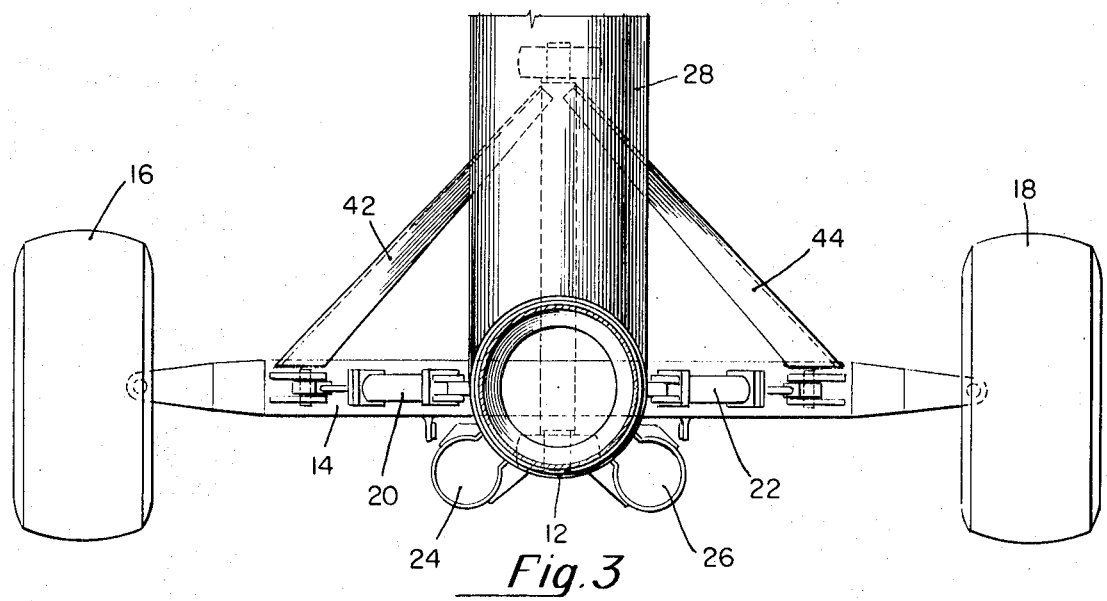
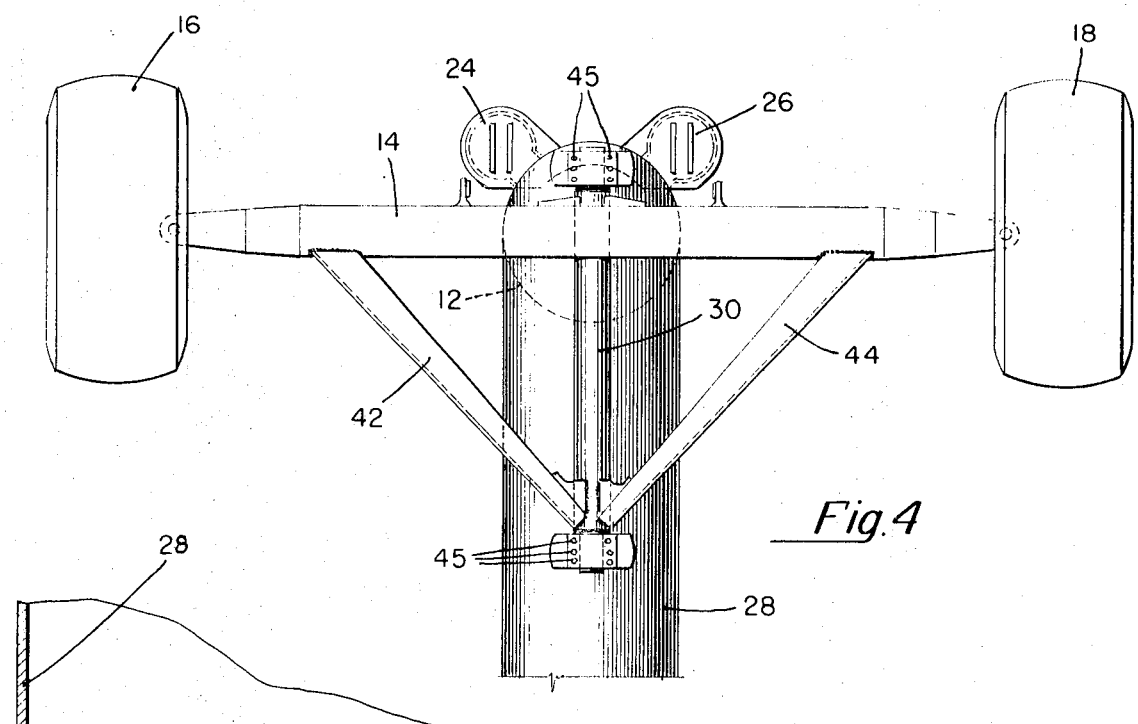
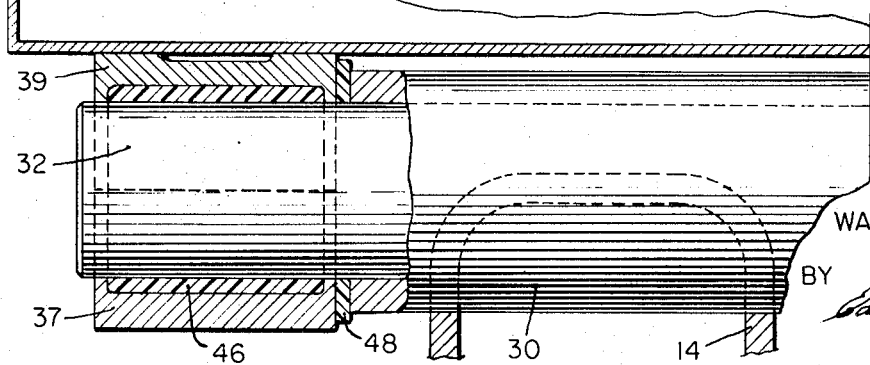

INVENTOR.
WALTER S. EGGERT, JR.
BY
Edward M. Farrell
ATTORNEY

PIVOTAL AXLE MOUNTING FOR AN AIRCRAFT TRANSFER VEHICLE

An aircraft transfer vehicle of the type related to the present invention is described in a copending patent application entitled "Aircraft Transfer Vehicle," filed Sept. 25, 1968, Ser. No. 762,443, assigned to the same assignee as the present invention. This copending patent application describes a vehicle including a chassis and a passenger pod. The pod is capable of being elevated to different levels. The vehicle is normally moved with the pod in the downward position and may be elevated to the floor level of an airplane after it is stopped to permit passengers to walk from the pod onto the airplane.

Because the pod member is elevated from the main base support of the vehicle, it is necessary that the supports for the pod be capable of withstanding relatively high stresses. This is especially true when braking is applied to the vehicle. When braking is applied to the vehicle, the pod which is relatively large and heavy, tends to exert an unusual force in the longitudinal forward direction. This in turn causes great stresses to be developed at the connecting points between the pod and the base portion of the vehicle. Even when the pod is stationary and in an elevated position, excessive winds may cause excessive stresses to be developed on the base supporting members of the vehicle.

An important consideration in building a vehicle as described in the aforementioned application relates to the assembly and disassembly of the parts. It is desirable that parts subject to excessive use, such as the wheels, axles and other supporting members, be removable from the main body of the vehicle.

It is an object of this invention to provide an improved support mechanism for a vehicle.

It is a further object of this invention to provide an improved mechanical arrangement for distributing some of the stresses resulting from excessive loads on the front axle of a vehicle.

It is still a further object of this invention to provide an improved mechanical arrangement having means for absorbing excessive shock applied to an axle of a vehicle to minimize its effect on the main chassis of the vehicle.

It is still a further object of this invention to provide an improved mechanical arrangement for compensating for excess stresses produced on a pod when it is in an elevated position.

It is still a further object of this invention to provide an improved support assembly which may be relatively easily removed from the main body of a vehicle.

An improved mechanical support arrangement is provided for a vehicle having a pod for transporting passengers from the vehicle to an airplane. The pod is supported on front and rear vertical posts. A main supporting elongated member supports the front vertical post with the pod thereon, with other means being provided for a back vertical supporting post. A shaft member rests in a recess of the front axle transverse thereto. The ends of shaft extend in opposite directions from the front axle. End members are secured to the ends of the shaft to support the elongated member away from the axle. A pair of diagonal strut members connect from the ends of the axle to the rearwardly extending end of the shaft. Suitable bearing elements are included on the ends of the shaft to permit some pivotal movement of the main supporting member with respect to the axle. A pair of hydraulic units are connected from the ends of the axle upwardly to the front vertical post.

Other objects and advantages of the present invention will be apparent and suggest themselves to those skilled in the art from a reading of the following specification and claims, in conjunction with the accompanying drawings, in which:

FIG. 3 is a top view, partly broken away, of the front mechanical support elements, in accordance with the present invention;

FIG. 4 is a bottom view of the front mechanical arrangement, in accordance with the present invention;

FIG. 5 is a cross-sectional view taken along line 5-5 of FIG. 2;

Because the present invention is directed primarily to the supporting arrangement for supporting the front of the pod of a vehicle, the complete system, as described in the aforementioned application, is not shown or described in detail for purposes of clarity.

Figure 1:
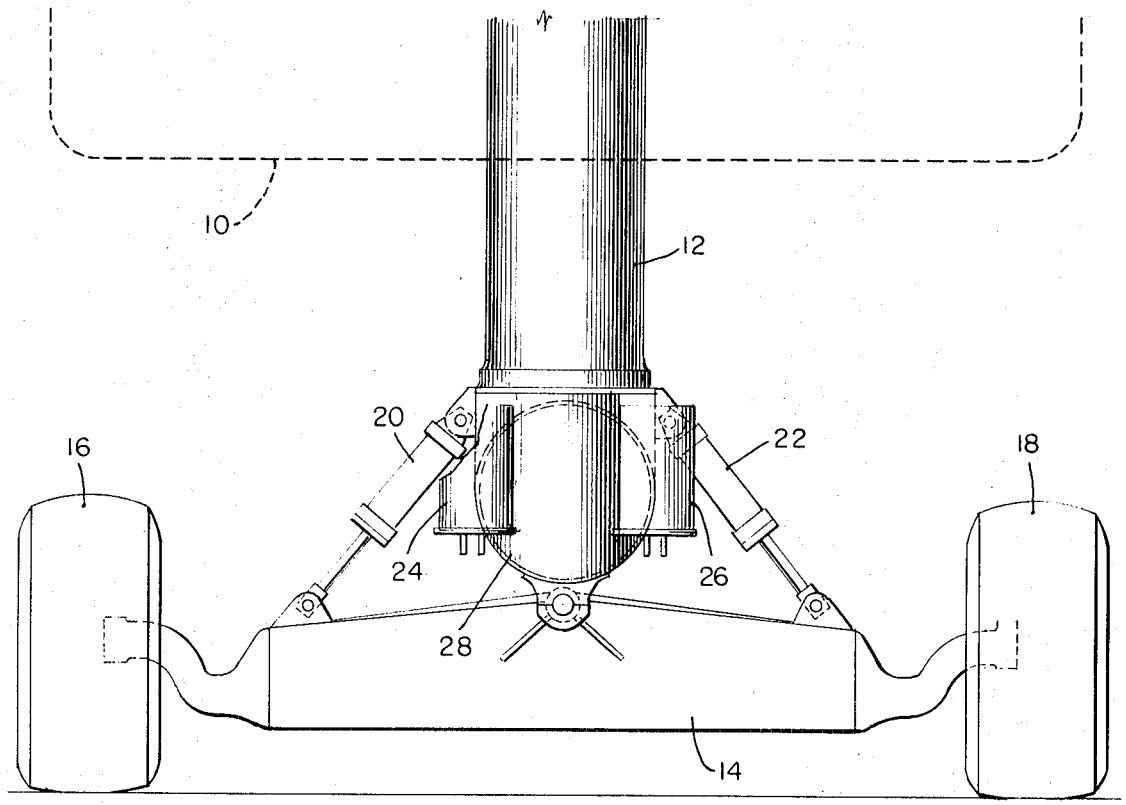
FIG. 1 illustrates the front view of a transfer vehicle including the front supporting mechanical arrangement for a vehicle with a passenger pod, in accordance with the present invention.

Referring particularly to FIG. 1, a pod 10 for carrying passengers is supported on a front vertical post 12 and is adapted to be moved up and down by means not illustrated. The vertical post 12 is supported on a front axle 14 which includes a pair of wheels 16, 18. A pair of hydraulic members 20, 22 are connected from points adjacent the ends of the front axle 14 upwardly to the vertical post 12. Spring members 24, 26 are provided to receive the pod 10 when it is in a down position and cushions the downward movement of the pod.

The main supporting longitudinal member 28 carries the front and rear vertical posts of the vehicle, with only the front vertical post 12 being illustrated in the drawing. The member 28 comprises a tubular member adapted to receive the vertical post 12 thereon by a mechanical attachment, such as by welding, bolting, or any other suitable means. The member 28 bears most of the stresses and thrusts developed by the front vertical post 12 and the back vertical post of the vehicle (not illustrated). This support element 28 is generally resting on the front and rear axles of the vehicle.

Because of the mechanical arrangement used for supporting the vehicle, stresses tend to be developed at the front supporting structure including the front axle of the vehicle. These stresses become especially acute when a braking operation is developed. If the braking operation is applied, a longitudinal thrust will be developed and the vehicle will tend to exert excessive forces at the points between the front vertical post 12 and the axle 14. It is important that this stress be distributed in some manner in order to alleviate the stresses which will tend to cause damage to the mechanical supporting parts involved.

The present invention tends to alleviate undue stresses by the mechanical arrangement which provides some insulation between the axle 14 and the main support member 28 which carries the front post 12 and the pod 10. This mechanical arrangement is interposed between the axle and the main supporting member and is illustrated in FIG. 2.

Figure 2:
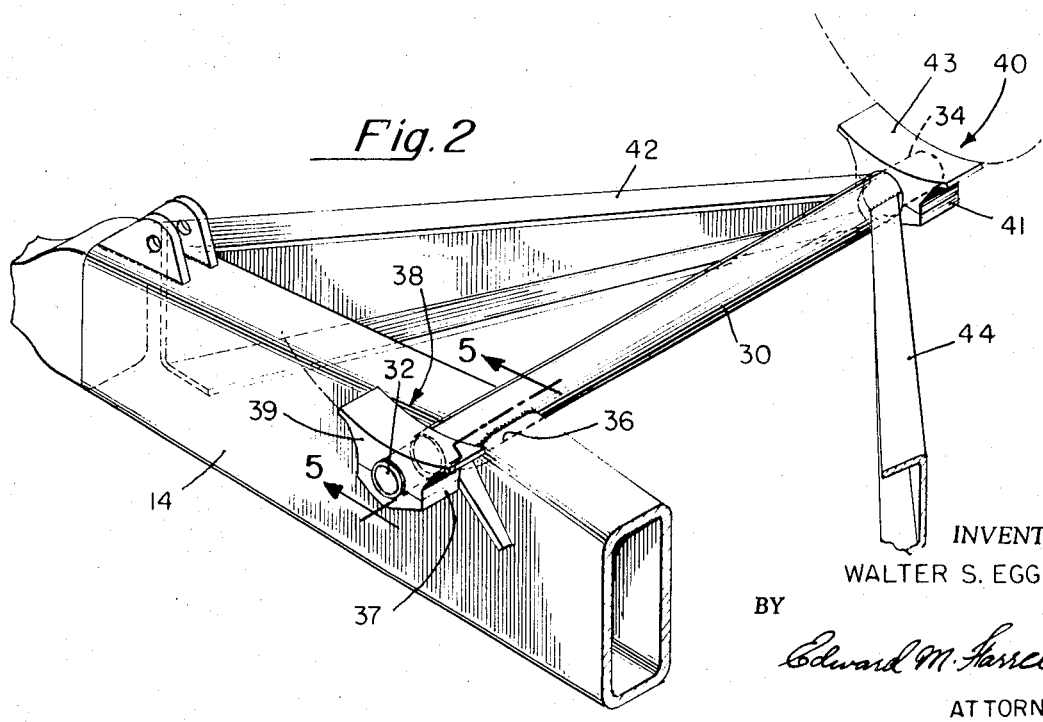
FIG. 2 is an isometric view, partly broken away, illustrating the main front mechanical support arrangement, in accordance with the present invention.
Figure 6:
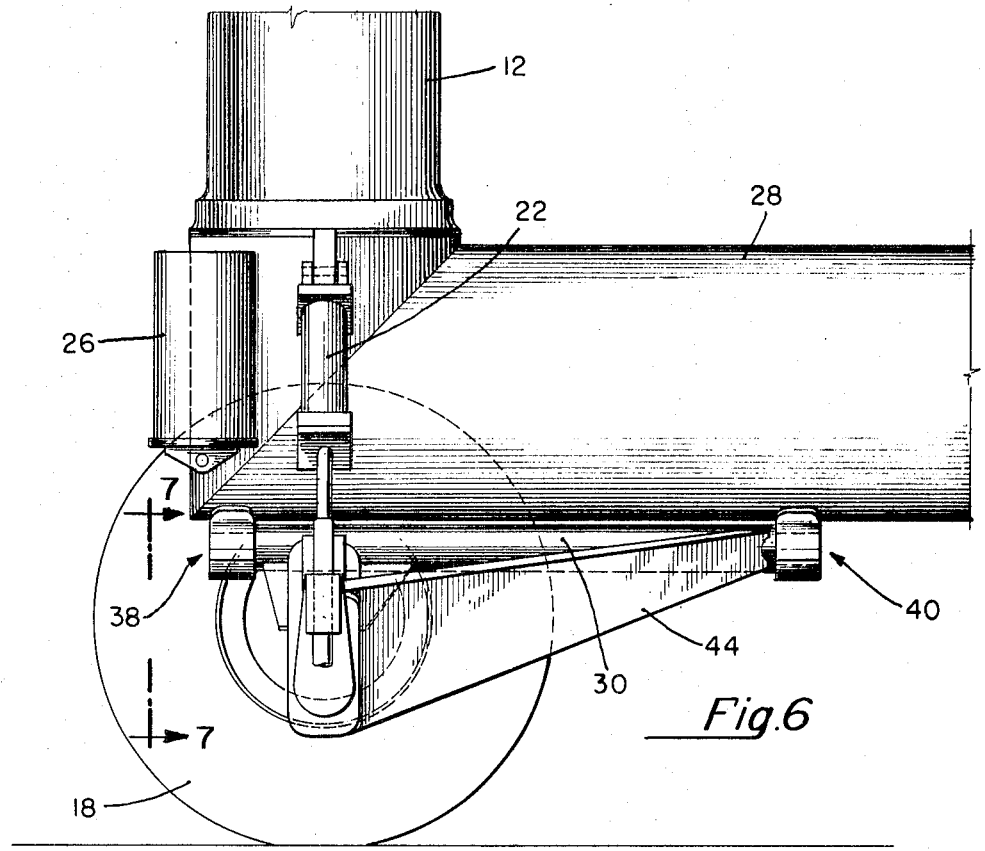
FIG. 6 is a side view of the front mechanical support arrangement, in accordance with the present invention.

Referring to FIG. 2, a hollow shaft member 30 of a fixed diameter includes a pair of members 32, 34 of smaller diameter disposed within the ends of the shaft 30. These portions may be inserted into the shaft by a press fit and welded or otherwise suitably secured to the shaft. The axle 14 includes an arcuate cutaway recess 36 dimensioned to receive the shaft 30 therein.

Referring to FIGS. 1 and 2, along with the other figures of the drawing, a pair of end members 38, 40 which may each comprise of two separate pieces bolted together. The member 38 includes top and bottom pieces 37, 39 and the member 40 includes top and bottom pieces 41, 43. The top pieces 39, 43 of end members 38 and 40 respectively, are welded or otherwise suitably secured to the supporting member 28. The bottom pieces 37, 41 are then bolted to the top pieces by means of bolts 45 (FIG. 4) or other suitable means.

A pair of strut elements 42, 44 are diagonally connected from points adjacent the ends of the axle 14 toward the rearwardly extending end of the shaft 30. The strut members are welded or otherwise suitably connected to the axle and the shaft. The strut members 42, 44 provide means for distributing any excessive load which may be developed on the axle 14.

It may be seen that the entire front support mechanism including the wheels and axle, may be removed from the main body of the vehicle by removing the bolts 45 to permit separation of two assemblies.

Referring particularly to FIG. 5, where only one end of the shaft 30 is illustrated, a bearing 46 is disposed around the end portion of the element 32 disposed in one end of shaft 30. Likewise, a bearing 48 which extends radially with respect to the axis of the shaft 30 is also included toward the end of the shaft 30. The bearing 46 which may comprise an impregnated graphite lining, is disposed between the end of the element 32 and the end member 38, comprising top and bottom pieces 37, 39 to permit a slight pivotal movement between the shaft 30 and the axle 14. The bearing 48 likewise disposed between the main portion of the shaft 30 and the end member 38 permits a slight pivotal movement as well as minimizing the metal to metal friction which may normally be developed between the connecting parts. The bearing elements also provide some flexibility to isolate the main chassis from the front support arrangement.

Figure 7:
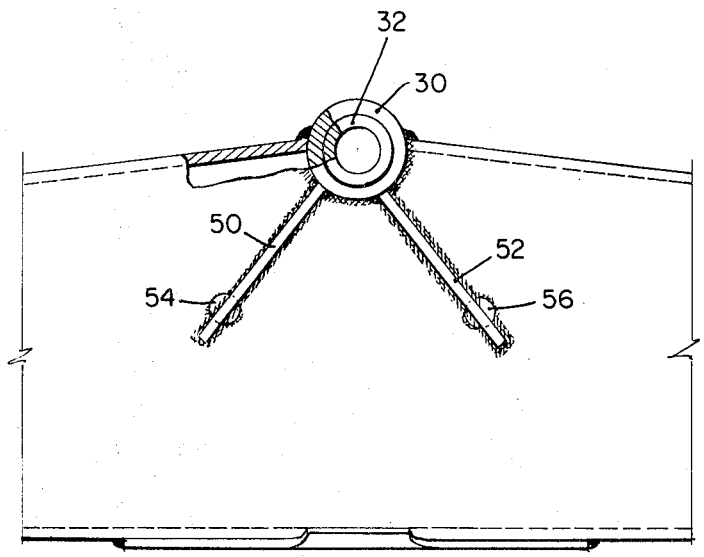
FIG. 7 is a view taken along line 7-7 of FIG. 6, with some of the parts being omitted, in accordance with the present invention.

The axle 14 is of the type which is generally made in two pieces which are welded together. Because of this the cutaway portion 36 for receiving the shaft 30 may tend to cause a weakness in the axle at this area to cause it to split unless reinforcement means are provided. A reinforcement arrangement, such as illustrated in detail in FIG. 7, includes front reinforcement members 50, 52. Similar back reinforcement members, not illustrated, are disposed on the opposite side of the axle to the one illustrated in FIG. 7.

Pin members 54, 56 extend through the axle 14 and connect the front reinforcement members 50, 52 to the rear reinforcement members. This reinforcement arrangement strengthens the axle and makes it possible to provide the recess therein necessary to receive the shaft 30.

With the arrangement illustrated, if braking is applied to a vehicle, a longitudinal torque will be developed causing stresses to be developed. If all these stresses were applied to a central point on the axle, breakdown may occur. The mechanical arrangement illustrated in FIG. 2 provides for a distribution of the applied stresses developed at the axle. In addition, slight pivotal movements about the bearing points is permitted by the bearing arrangement and provides some isolation between the forces developed by the chassis and axle of the vehicle.

If forces are developed by the axle as a result of the wheels hitting an obstruction, the arrangement illustrated provides means for absorbing some of the forces developed to prevent them from being transmitted from the axle to the chassis.

When the pod 10 is in an up position, the hydraulic member 20, 22 helps in maintaining stability for the pod, especially if high winds are encountered. This arrangement is described in a copending patent application entitled "Stabilizer Brake Apparatus," filed Dec. 30, 1968, Ser. No. 787,891, (now U.S. Pat. No. 3,532,187) which is assigned to the same assignee as the present invention.

The present invention has provided a novel arrangement for supporting the front chassis of a vehicle. The mechanical arrangement has provided means for distributing stresses developed within the main body of a chassis of a vehicle. Isolation between the main chassis and axle assembly has also been provided. Finally, means for stabilizing the vehicle with the pod in an up position has also been provided by the present invention. All of these features of the present invention provide for a smoother, safer transport of a passenger from an airport terminal to an airplane.

What I claim is:

1. In combination with a vehicle for transporting passengers having a pod supported on a vertical post resting on the front axle of the vehicle, a main supporting elongated member connected to said vertical post for supporting said vertical post with said pod thereon, means disposed between said axle and said main support member, said means comprising a shaft member extending parallel with said elongated member, said shaft member resting on said axle transverse thereto with the ends of said shaft extending in opposite directions from said axle, end members to receive the ends of said shaft and secured to said main support member to support said main support member away from said axle, and a pair of diagonal strut members connected from points adjacent the ends of said axle to said shaft member toward the rearwardly extending end of said shaft member.

2. The invention as set forth in claim 1 wherein a pair of hydraulic members are connected from points adjacent the ends of said axle upwardly to said vertical post.

3. The invention as set forth in claim 2 wherein bearing elements are disposed around the end of said shaft member between said shaft member and said end members.

4. The invention as set forth in claim 3 wherein said shaft member comprises a hollow main portion of a fixed diameter dimensioned to receive end pieces of smaller diameter with said end pieces, having said bearing elements thereon.

5 The invention as set forth in claim 4 wherein an additional pair of bearing elements are disposed to between the ends of the hollow main portion of said shaft and said end members.

6. The invention as set forth in claim 5 wherein said axle includes an arcuate cutaway recess to receive said shaft member therein.

7. The invention as set forth in claim 6 wherein reinforcement means are provided for said axle at the area adjacent said cutaway recess.

8. The invention as set forth in claim 7 wherein said reinforcement means include support elements on either side of said axle with a plurality of connecting pins connecting said support elements.